United States Patent [19]

Duncan

[11] Patent Number: 5,148,440
[45] Date of Patent: Sep. 15, 1992

[54] WICK FOR METAL VAPOR LASER

[75] Inventor: David B. Duncan, Livermore, Calif.

[73] Assignee: The United States of America as represented by the United States Department of Energy, Washington, D.C.

[21] Appl. No.: 554,869

[22] Filed: Nov. 25, 1983

[51] Int. Cl.$^5$ .......................... H01S 3/03; H01S 3/02
[52] U.S. Cl. ........................ 372/56; 372/59; 372/63; 359/377; 359/342
[58] Field of Search ...................... 330/4.3; 372/56, 59, 372/63; 359/337, 342

[56] References Cited

U.S. PATENT DOCUMENTS

| | | | |
|---|---|---|---|
| 3,654,567 | 4/1972 | Hodgson | 372/56 |
| 3,867,178 | 1/1955 | Ferror | 330/4.3 |
| 3,906,398 | 9/1975 | Law et al. | 372/56 |
| 4,151,486 | 4/1979 | Itzken et al. | 372/56 |
| 4,247,830 | 7/1981 | Karras et al. | 372/56 |
| 4,442,523 | 4/1984 | Brichs | 372/56 |
| 4,504,953 | 3/1985 | Stevens | 372/56 |

OTHER PUBLICATIONS

Karras et al., "Metal Vapor Laser Contaminant Study", May 1980, pp. 1-103, NTIS AD-A100 906/7 abst. provided.

Primary Examiner—Nelson Moskowitz
Attorney, Agent, or Firm—Miguel Valdes; Roger S. Gaither; William R. Moser

[57] ABSTRACT

An improved wick for a metal vapor laser is made of a refractory metal cylinder, preferably molybdenum or tungsten for a copper laser, which provides the wicking surface. Alternately, the inside surface of the ceramic laser tube can be metalized to form the wicking surface. Capillary action is enhanced by using wire screen, porous foam metal, or grooved surfaces. Graphite or carbon, in the form of chunks, strips, fibers or particles, is placed on the inside surface of the wick to reduce water, reduce metal oxides and form metal carbides.

20 Claims, 3 Drawing Sheets

WICK FOR METAL VAPOR LASER

The United States Government has rights in this invention pursuant to Contract No. W-7405-ENG-48 between the U.S. Department of Energy and the University of California, for the operation of Lawrence Livermore National Laboratory.

BACKGROUND OF THE INVENTION

The invention relates generally to copper and other metal vapor lasers, and more particularly, to wicks used in such lasers for recirculation of condensed metal vapor.

A metal vapor laser, e.g., copper (CVL), operates by passing a current through a metal vapor within a refractory tube, exciting the metal atom electrons to specific energy levels, then emitting energy when stimulated by the passage of specific energy photons. The refractory tube is heated either by the discharge current or an external heat source. Copper or other metal is placed in the discharge tube at a point where a given steady state temperature will exist. The copper vaporizes and fills the discharge tube to the equilibrium partial pressure for copper at the source temperature. The discharge tube is filled with a buffer gas, e.g., helium or neon, at subatmospheric pressure, to provide an electrical conduction path through the discharge tube and to control copper transport. The buffer gas pressure is such that the copper atoms are in a highly collisional diffusion regime. Copper that collides with the refractory wall on the hot side of the source remains as a vapor, whereas collisions on the cool side result in condensation of the vapor. This condensed copper does not contribute to the laser operation unless it can be returned to the source region. Thus, a wick is used to condense copper and transport it to the source region.

In a metal vapor laser, particularly copper vapor laser or gold vapor laser, the metal vapor condenses on the cold end of the wick and is carried back to the hot region by capillary action. Through various loss mechanisms, the copper is depleted and the lifetime of the laser is less than a few hundred hours. The conventional wick oxidizes and cannot be wet by the condensing copper; sputtered electrode materials form an oxide coating on the condensed copper to inhibit wicking action.

U.S. Pat. No. 3,654,567 to Hodgson, issued Apr. 4, 1972 describes a vapor discharge cell having wicks for use in a vapor laser. Each wick has an evaporation region and a condensation region; a vapor-liquid circulation cycle is established whereby as the vapor condenses on the condensation region it is pulled by surface tension forces through the wick to the evaporation region where it is re-evaporated.

U.S. Pat. No. 4,247,830 to Karras, et al, issued Jan. 27, 1981 is directed to plasma sprayed wicks for pulsed metal vapor lasers. Improved wicks for recirculating condensed vapor back to the discharge zone of a metal vapor laser are described. The wicks are generally tubular in configuration and may be formed of sintered metal or of a metal substrate with a porous plasma sprayed layer thereon.

Accordingly, it is an object of the invention to provide an improved wick for a copper or other metal vapor laser.

It is also an object of the invention to improve the wicking mechanism in a copper or other metal vapor laser.

It is a further object of the invention to control the chemical environment in the laser to control contaminants to the wick's surface.

It is also an object of the invention to reduce oxides of copper or other metal back to copper or other metal in a copper or other metal vapor laser to prevent loss of the active gain medium in the laser.

It is another object of the invention to provide longer life operation of a copper or other metal vapor laser than has been possible in the previous state of the art.

It is a further object of the invention to provide a useful life in excess of 1000 hours for a copper or other metal vapor laser.

SUMMARY OF THE INVENTION

The invention is an improved wick for a copper or other metal vapor laser. A refractory metal cylinder, preferably molybdenum or tungsten for a copper laser, provides the wicking surface. Alternately, the inside surface of the ceramic laser tube can be metalized to form the wicking surface. Capillary action can be enhanced by using wire screen, porous foam metal or grooved surfaces. Graphite or carbon, in the form of chunks, strips, fibers or particles, is placed on the inside surface of the wick to reduce water, reduce metal oxides, and form metal carbides. Alternately gaseous carbon in the form of carbon monoxide or hydrocarbons is mixed with the buffer gas to provide a carbon source. The invention is thus a self-repairing wick which renews the wick surface coating with an additive.

DETAILED DESCRIPTION OF THE PREFERRED EMBODIMENT

Figure 1:
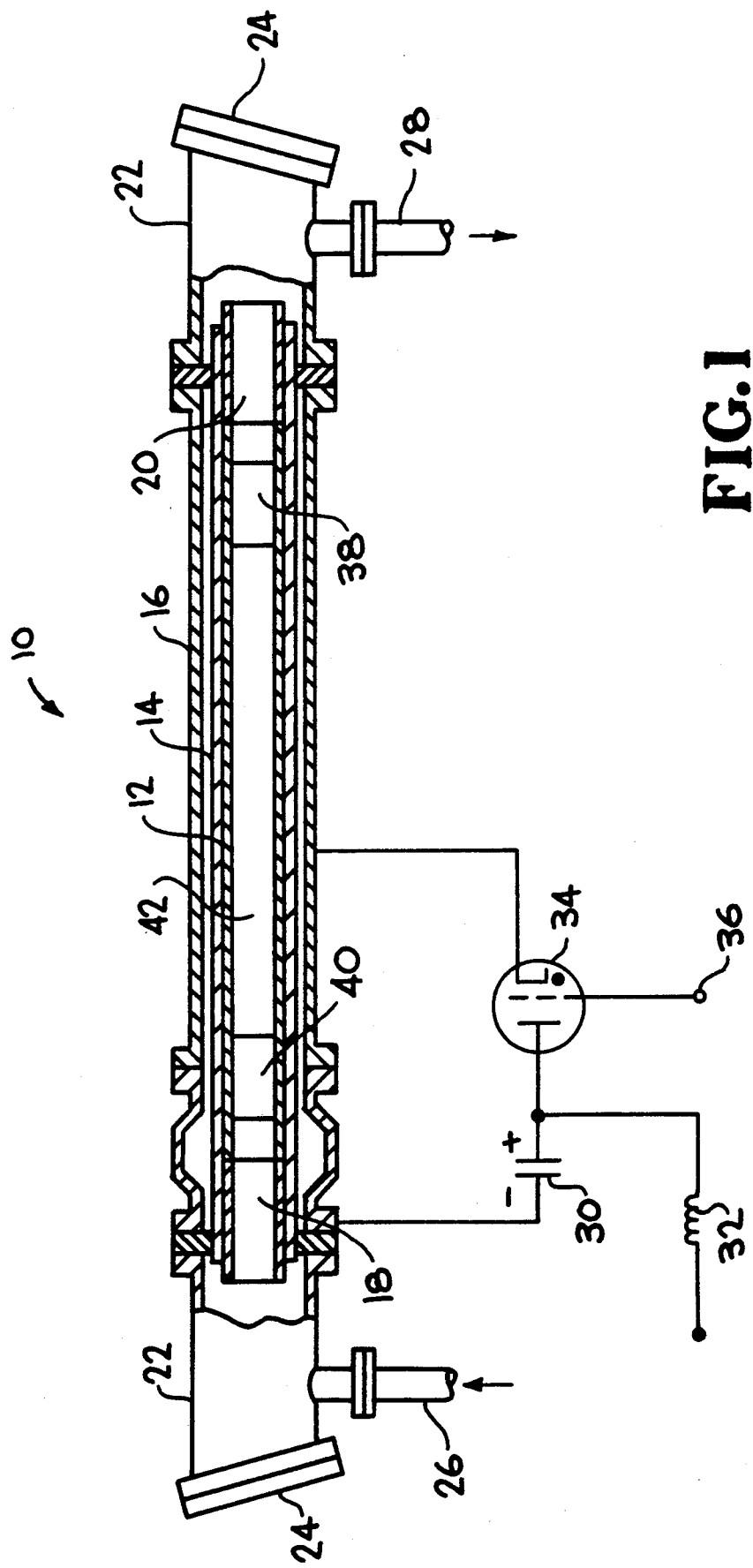
FIG. 1 is a sectional view of a longitudinal discharge pumped copper vapor laser.

A typical longitudinal discharge pumped copper vapor laser 10, as shown in FIG. 1, comprises a ceramic discharge tube 12 with an outer layer of heat shield material 14 surrounded by water-cooled vacuum jacket 16. A suitable ceramic for tube 12 is alumina. A pair of electrodes, cathode 18 and anode 20 are located at the ends of the ceramic discharge tube 12. End assemblies 22 containing optical windows 24 are mounted at the ends of the laser 10, with the windows 24 aligned with the bore of tube 12. A buffer gas is flowed into the laser 10 through inlet 26 and removed through outlet 28. An electrical discharge is produced in ceramic tube 12 between electrodes 18 and 20 in a conventional manner, e.g., by discharging a capacitor 30 connected across the electrodes by means of thyratron switch 34 which is triggered by timing signal 36. The capacitor 30 is charged from a charging circuit (not shown) through inductor 32. Other circuits can be used to provide the axial discharge. A pair of sources or wicks 38 and 40 are located near the ends of the discharge tube 12 inside the electrodes 18, 20. The portion of the discharge tube 12 between the wicks 38, 40 forms the gain region 42 of the laser. Wicks can also be used for metal containment in transverse discharge lasers.

Figure 2:
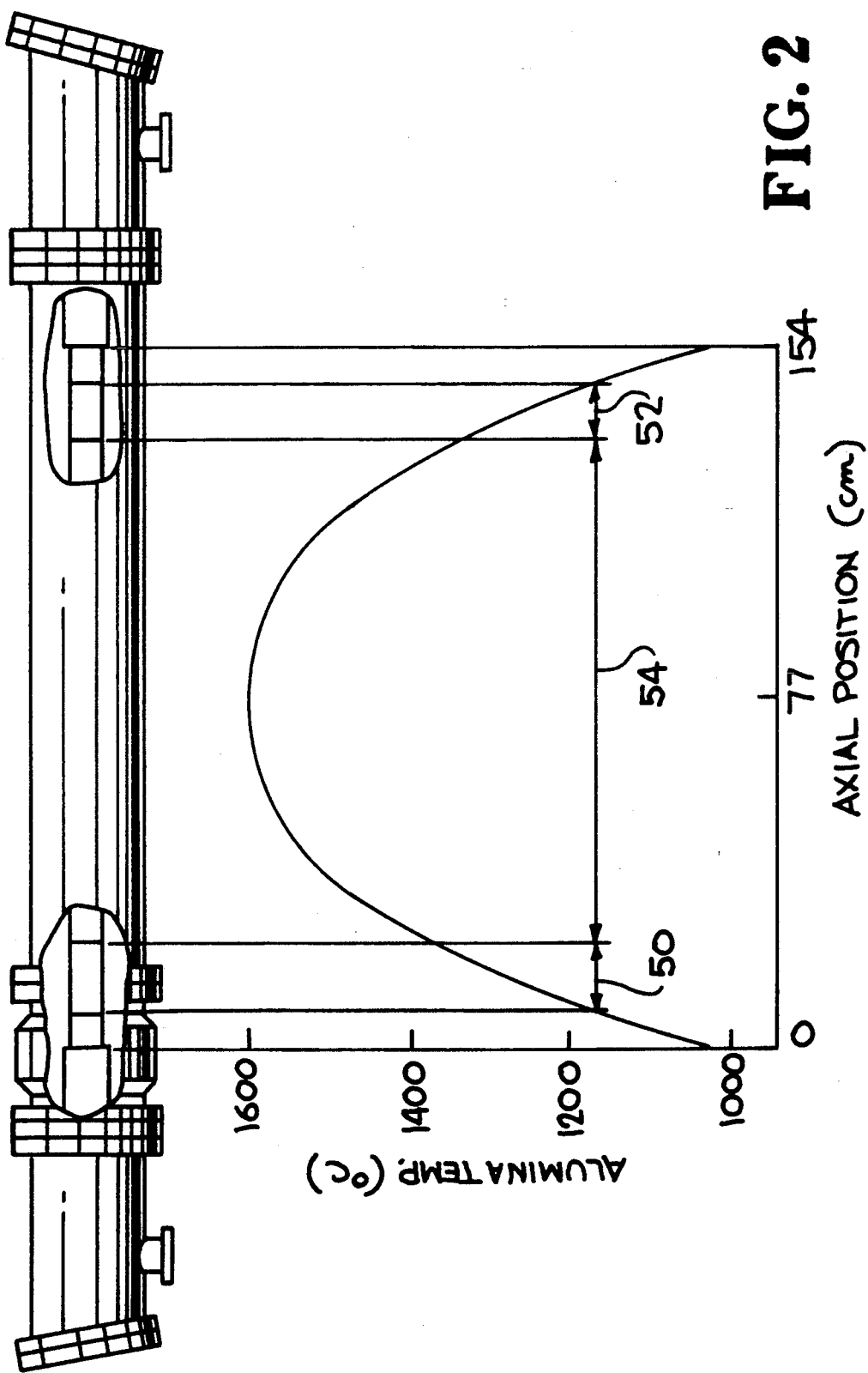
FIG. 2 is a typical temperature profile for the copper laser of FIG. 1.

A thermal profile for a large bore copper vapor laser is illustrated in FIG. 2 which plots the temperature of a 154 centimeter alumina ceramic tube 12 as a function of axial position. The thermal profile is divided into the two wick regions 50 and 52 and the hot zone or gain region 54 which forms the active part of the laser. The maximum temperature is set by the tube materials. The temperature profile across the wick regions 50 and 52 is such that copper vapor condenses on the cooler outer portion and is transported along the wick to the hotter inner portion where it is re-evaporated.

The invention is an improved design for the wicks 38 and 40 which allows the wick to constantly renew the surface coating of the wick to enhance wicking action and to control the chemical environment to reduce contamination of the surface. The wick is made of a refractory metal, typically shaped as a cylinder, to provide the wicking surface. Alternately, the inside surface of tube 12 can be metalized. By metalizing the laser tube surface, the wick cylinder is eliminated which increases the laser aperture, which may be a significant advantage in a particular configuration. The metalized layer can be formed by any conventional process including vapor deposition or plasma spraying. Molybdenum or tungsten are the preferred materials for a copper laser; tantalum, niobium, or alloys including any combination of these metals and/or other materials may also be used. The use of a wire screen, porous foam metal, grooved surfaces, or other methods to increase the surface area enhances capillary action and thus the wicking mechanism to transport copper from the condensing region to the evaporation region of the wick. The wick may be formed of a screen or foam, or can include a screen or foam placed inside a solid metal cylinder or layer. Carbon, e.g., graphite, in the form of chunks, strips, fibers or particles is placed on the inside surface of the wick or carbon in the form of carbon monoxide or gaseous hydrocarbons is mixed with the buffer gas to continuously maintain a metal carbide layer on the wick surface.

Figure 3:
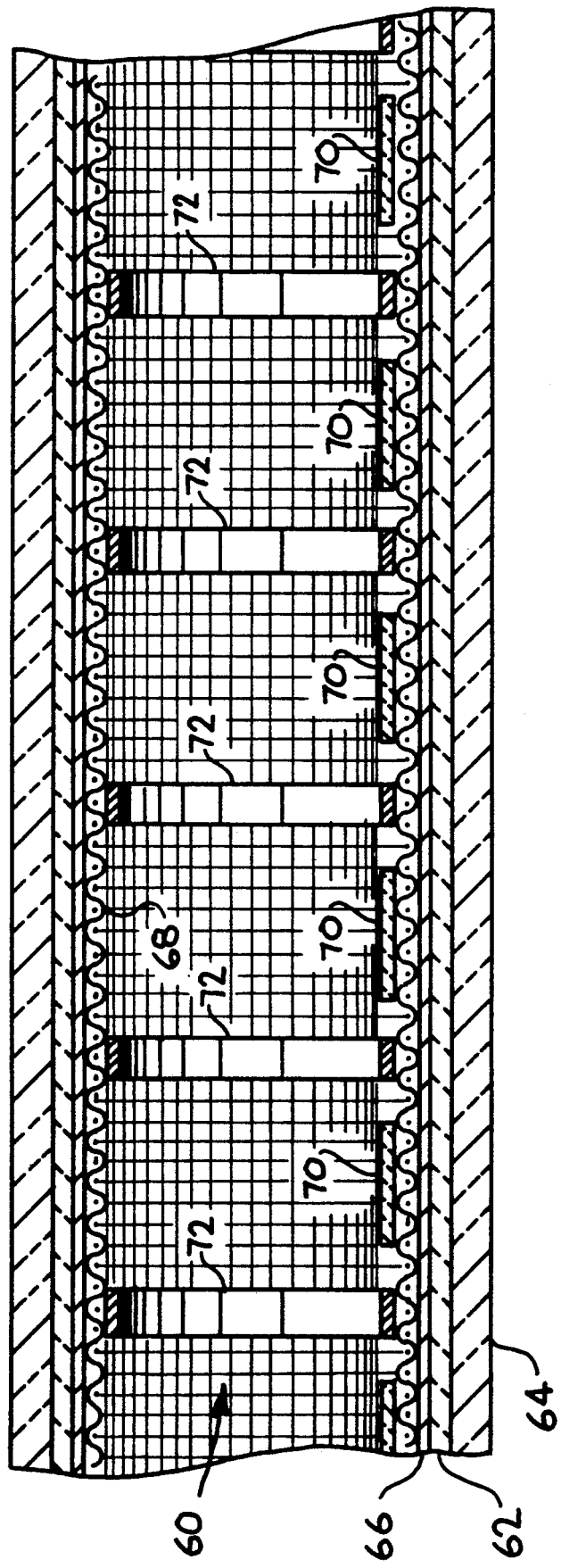
FIG. 3 is a sectional view of a copper wicking source (wick) according to the invention.

A copper wicking source or wick 60 according to the invention, shown in FIG. 3, is mounted in a plasma tube 62 which is surrounded by an insulation layer 64. The wick 60 comprises a shell 66 made of a refractory metal, e.g., molybdenum for a copper laser, which is formed in the shape of a cylinder which fits tightly inside tube 62. Alternatively, non-cylindrical wick geometries may be used if desired. In place of the shell 66, a metalized layer may be formed on the inside surface of tube 62. In order to increase the surface area and thereby the wicking action of the wick 60, a wire screen 68, e.g., also made of molybdenum for a copper laser, is placed on the inside surface of the refractory metal shell 66. In place of the wire screen 68 a porous metal foam could also be used. Alternatively, instead of using a separate element such as screen 68, grooves can be formed on the inside surface of the shell 66. Graphite sheets 70 are placed inside the cylinder 66, e.g., on the wire screen 68, so that in operation a metal carbide layer is formed and maintained on the inner surface of the wick 60. The carbon may be in any form including chunks, particles or fibers, as well as strips; alternatively, a gaseous hydrocarbon or carbon monoxide could be introduced into the wick 60. Retaining bands 72 (optionally) are spaced along the inner surface of the wick 60 to provide structural support.

The invention accomplishes two major purposes. The first purpose is wicking, to provide a surface where copper or other metal vapor can condense and a mechanism to transport copper from the condensing area to the hot end of the wick. With this wick design, copper wets the wick surface and is transported toward the hot end by capillary action (surface tension) in an improved manner. The second purpose is chemical, to control the chemical environment in the laser so as to control the contaminants to the wick surface. A basic feature of CVL lasers is that they are made of refractory materials that outgas water. This water, at high temperatures, reacts with metals, forming metal oxides. Metal oxides are not wet by copper. Formation of metal oxides on the wick surface limits wetting. Also, sputtered electrode materials oxidize and form a floating sludge on the copper source limiting copper evaporation. To further reduce possible contamination of the wick according to the invention, the laser electrodes should be made of material compatible with the wick material, e.g., molybdenum or tungsten for a copper vapor laser.

The carbon serves several purposes:
1) reduces water with the following reaction:

$$nH_2O + mC = nH_2 + pCO + gCO_2$$

$$H_2O + CO = H_2 + CO_2$$

2) reduces metal oxides:

$$M_nO_m + mC = nM + mCO$$

$$M_nO_m + mCO = nM + mCO_2$$

3) forms metal carbides:

$$nM + mC = M_nC_m.$$

$$M + 2CO = MC + CO_2$$

The carbon is transported by several mechanisms:
1) dissolved in the liquid copper;
2) in suspension in the liquid copper;
3) by forming volatile hydrocarbons by combination with the hydrogen from the water and then later disassociating; and
4) formation of CO which can then be disassociated by the electrical discharge.

The refractory metal cylinder is carbonized to form a metal carbide. This metal carbide surface is wet by the liquid copper, providing a wicking surface. The carbonizing will occur on any wick geometry (i.e., screen, grooved sheet, foam, etc.). If the carbide surface is reduced to pure metal or is oxidized, either by discharge attack or oxidation, the oxide will be reduced by the carbon and the metal will recarbonize. Thus, a dynamic equilibrium will exist.

Metal or metal oxide particulate that may end up on the wick or liquid copper surface is reduced and forms a carbide. This carbide particulate is wetted by the copper and becomes a suspension within the copper.

The carbon can be in the form of chunks or strips on the wick surface, fibers, or particles distributed about the wick structure. The carbon can be amorphous, or crystalline and exist in any geometric shape. Carbon can also be in the form of a gaseous hydrocarbon or carbon monoxide.

The carbon also helps reduce copper oxide back to pure copper further enhancing the wick's ability to contain the copper. Since copper oxide is more volatile than copper, it does not condense at the source region and tends to diffuse out of the laser reducing the available supply of copper. By reducing the copper oxide within the laser's active volume back to copper this effect is reduced.

Accordingly, the improved wick according to the invention continuously renews a metal carbide surface on the inside of the wick to enhance wicking action and reduce the effects of contaminants in a copper or other metal vapor laser. More generally, the surface may be renewed with any other suitable material by placing the appropriate additive in the wick of a metal vapor laser.

A wick has been sucessfully tested in two sizes of lasers, demonstrating a useful life of in excess of 1000 hours. The wicks were composed of a molybdenum shell with a molybdenum screen on the inside surface. Molybdenum retaining rings were used to support the screen. The wick external dimensions for the two tests were 1.625 inches o.d.×6 inches long and 3.125 inches o.d.×11 inches long. Graphite foil strips were placed inside the cylinder. No visible degradation of the molydenum parts was observed. Evidence of the chemical environments was determined by using a mass spectrometer to evaluate the exiting buffer gas composition. The predominant gas in addition to the neon was carbon monoxide. Secondarily, water, hydrogen and carbon dioxide were present. High purity neon was the only gas introduced into the laser. Evidence of the carbonization was determined by an x-ray diffraction analysis of the molybdenum surface. The primary component observed was molybdenum carbide. Some elemental molybdenum was observed. No evidence existed for the presence of molydenum oxide. Significant quantities of molybdenum oxide are observed in lasers operated without the presence of carbon. A particulate molybdenum carbide is present on the surface of copper in a wick that has been operated in a laser. This particulate is not observed while the copper is molten indicating that the particles are in suspension and are zone refined to the surface during solidification. The particles are predominately molybdenum carbide. The wetting angle of the copper with the wick approaches zero indicating perfect wetting. A low wetting angle is typical for molybdenum carbide and is not observed with elemental molybdenum or molybdenum oxide.

Changes and modifications in the specifically described embodiments can be carried out without departing from the scope of the invention which is intended to be limited only by the scope of the appended claims.

I claim:

1. A wick for a metal vapor laser comprising:
   a refractory metal cylinder, and
   means operatively associated with the cylinder to constantly renew a surface coating on the inside surface of the cylinder to enhance wicking action and to control the chemical environment to reduce contamination of the surface.

2. The wick of claim 1 wherein the refractory metal cylinder is formed of a screen.

3. The wick of claim 1 wherein the refractory metal cylinder is formed of a foam.

4. The wick of claim 1 wherein the refractory metal cylinder is formed of a solid sheet.

5. The wick of claim 1 wherein the refractory metal cylinder is formed by metalizing the inside surface of a ceramic laser tube to form a layer of refractory metal on the tube.

6. The wick of claim 1 for a copper vapor laser wherein the refractory metal cylinder is formed of molybdenum, tungsten, tantalum, niobium, or alloys including at least one of these metals.

7. The wick of claim 1 wherein the means to renew a surface coating comprises a source of carbon adjacent to the inside surface of the cylinder to continuously maintain a carbide layer on the inside surface of the cylinder, to reduce water vapor, and to reduce metal oxides.

8. The wick of claim 7 wherein the carbon is in the form of chunks.

9. The wick of claim 7 wherein the carbon is in the form of strips.

10. The wick of claim 7 wherein the carbon is in the form of fibers.

11. The wick of claim 7 wherein the carbon is in the form of particles.

12. The wick of claim 7 wherein the carbon is in the form of gaseous carbon in contact with the wick surface.

13. The wick of claim 12 wherein the gaseous carbon is in the form of carbon monoxide.

14. The wick of claim 12 wherein the gaseous carbon n the form of a hydrocarbon.

15. The wick of claim 7 further including a screen of refractory material placed on the inside surface of the cylinder.

16. The wick of claim 7 further including a grooved sheet of refractory material placed on the inside surface of the cylinder.

17. The wick of claim 7 further including a metal foam of refractory material placed on the inside surface of the cylinder.

18. A method for enhancing the wicking action of a wick in a metal vapor laser, comprising:
    forming the wick of a refractory metal;
    carbonizing in-situ the inside surface of the wick to form a metal carbide surface which reduces water, reduces metal oxides, and forms metal carbides by placing a source of carbon adjacent to the inside surface of the wick.

19. The method of claim 18 for a copper vapor laser wherein the wick is formed of molybdenum, tungsten, tantalum, niobium, or alloys including at least one of these metals.

20. The method of claim 18 further comprising forming an electrode of the metal vapor laser of a refractory metal compatible with the wick.

* * * * *